United States Patent
McKean

(10) Patent No.: US 8,041,991 B2
(45) Date of Patent: Oct. 18, 2011

(54) SYSTEM AND METHOD FOR RECOVERING SOLID STATE DRIVE DATA

(75) Inventor: Brian McKean, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 254 days.

(21) Appl. No.: 12/313,205

(22) Filed: Nov. 18, 2008

(65) Prior Publication Data

US 2010/0125751 A1     May 20, 2010

(51) Int. Cl.
*G06F 11/00*   (2006.01)
(52) U.S. Cl. .................................................. 714/6.32
(58) Field of Classification Search .............. 714/5–8, 714/6.13, 6.32
See application file for complete search history.

(56) References Cited

U.S. PATENT DOCUMENTS

| | | | |
|---|---|---|---|
| 5,701,407 A * | 12/1997 | Matsumoto et al. ......... | 714/6.32 |
| 6,427,215 B2 | 7/2002 | Rafanello et al. | |
| 6,560,718 B1 * | 5/2003 | Wilson .............................. | 714/5 |
| 7,024,586 B2 * | 4/2006 | Kleiman et al. .................. | 714/7 |
| 7,028,216 B2 * | 4/2006 | Aizawa et al. ..................... | 714/7 |
| 7,149,846 B2 * | 12/2006 | Hetrick .......................... | 711/114 |
| 7,197,662 B2 * | 3/2007 | Bullen et al. ...................... | 714/6 |
| 7,490,261 B2 * | 2/2009 | Gaertner et al. .................. | 714/8 |
| 7,711,897 B1 * | 5/2010 | Chatterjee et al. ............ | 711/114 |
| 2003/0237019 A1 * | 12/2003 | Kleiman et al. .................. | 714/6 |
| 2006/0053338 A1 * | 3/2006 | Cousins et al. ................... | 714/6 |
| 2007/0168698 A1 | 7/2007 | Coulson et al. | |
| 2007/0180239 A1 | 8/2007 | Fujibayashi et al. | |
| 2008/0126712 A1 * | 5/2008 | Mizushima ................... | 711/141 |
| 2009/0063895 A1 * | 3/2009 | Smith ............................... | 714/7 |

* cited by examiner

*Primary Examiner* — Michael Maskulinski
*Assistant Examiner* — Elmira Mehrmanesh
(74) *Attorney, Agent, or Firm* — Suiter Swantz pc llo

(57) ABSTRACT

A method for recovering solid state drive (SSD) data may comprise: detecting a failed SSD comprising one or more data blocks; receiving a request to write data to the one or more data blocks of the failed SSD; writing the data to one or more data blocks of an operational drive; and rebuilding the failed SSD from the failed SSD and the one or more data blocks of the operational drive.

A system for recovering solid state drive (SSD) data may comprise: means for detecting a failed SSD comprising one or more data blocks; means for receiving a request to write data to the one or more data blocks of the failed SSD; means for writing the data to one or more data blocks of an operational drive; and means for rebuilding the failed SSD from the failed SSD and the one or more data blocks of the operational drive.

15 Claims, 8 Drawing Sheets

FIG. 7A

104 SSD

| Data Block 1 | Data Segment 200 |
| Data Block 2 | Data Segment 210 |
| Data Block 3 | Data Segment 80 |
| Data Block 4 | Data Segment 500 |
| Data Block 5 | Data Segment 550 |
| Data Block 6 | Data Segment 211 |
| Data Block 7 | Data Segment 150 |
| Data Block 8 | Data Segment 175 |

106 Snapshot SSD

| Data Block 1 | |
| Data Block 2 | |
| Data Block 3 | |
| Data Block 4 | |
| Data Block 5 | |
| Data Block 6 | |
| Data Block 7 | |
| Data Block 8 | |

| Data Segment | SSD | Data Block |
|---|---|---|
| 80 | 104 | 3 |
| 150 | 104 | 7 |
| 175 | 104 | 8 |
| 200 | 104 | 1 |
| 210 | 104 | 2 |
| 211 | 104 | 6 |
| 500 | 104 | 4 |
| 550 | 104 | 5 |

FIG. 8A

104 SSD

| Data Block 1 | Data Segment 200 |
| Data Block 2 | Old Data Segment 210 |
| Data Block 3 | Data Segment 80 |
| Data Block 4 | Data Segment 500 |
| Data Block 5 | Data Segment 550 |
| Data Block 6 | Old Data Segment 211 |
| Data Block 7 | Data Segment 150 |
| Data Block 8 | Data Segment 175 |

105 Snapshot SSD

| Data Block 1 | Data Segment 210 |
| Data Block 2 | Data Segment 211 |
| Data Block 3 | |
| Data Block 4 | |
| Data Block 5 | |
| Data Block 6 | |
| Data Block 7 | |
| Data Block 8 | |

| Data Segment | SSD | Data Block |
|---|---|---|
| 80 | 104 | 3 |
| 150 | 104 | 7 |
| 175 | 104 | 8 |
| 200 | 104 | 1 |
| 210 | 105 | 1 |
| 211 | 105 | 2 |
| 500 | 104 | 4 |
| 550 | 104 | 5 |

SYSTEM AND METHOD FOR RECOVERING SOLID STATE DRIVE DATA

BACKGROUND

Solid state drives (SSDs) may wear out over time as the NAND technologies that the drives are based on have a limited number or program/erase cycles. Over time, SSDs may reach a point where an erase cycle fails to reset a NAND flash block to a writable state. Such an SSD may be said to be failed. Current disk array controllers designed to handle traditional spindle-based disk drives may employ failure modes that affect both reading and writing, rendering the drives useless.

However, some SSD may employ a read-only failure mode that allows the drive to execute read commands successfully even though write commands result in a failure. As the typical response of current disk array controllers to a failed write command is to designate the drive as failed, such controllers can not effectively utilize the read-only failure mode of SSDs.

SUMMARY

The present disclosure is directed to a system and method for recovering solid state drive (SSD) data.

A method for recovering solid state drive (SSD) data may comprise: detecting a failed SSD comprising one or more data blocks; receiving a request to write data to the one or more data blocks of the failed SSD; writing the data to one or more data blocks of an operational drive; and rebuilding the failed SSD from the failed SSD and the one or more data blocks of the operational drive.

A system for recovering solid state drive (SSD) data may comprise: means for detecting a failed SSD comprising one or more data blocks; means for receiving a request to write data to the one or more data blocks of the failed SSD; means for writing the data to one or more data blocks of an operational drive; and means for rebuilding the failed SSD from the failed SSD and the one or more data blocks of the operational drive.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which:

FIG. 7A shows an SSD configuration.

FIG. 7B shows a look-up table configuration.

FIG. 8A shows an SSD configuration.

FIG. 8B shows a look-up table configuration.

DETAILED DESCRIPTION

Figure 1:
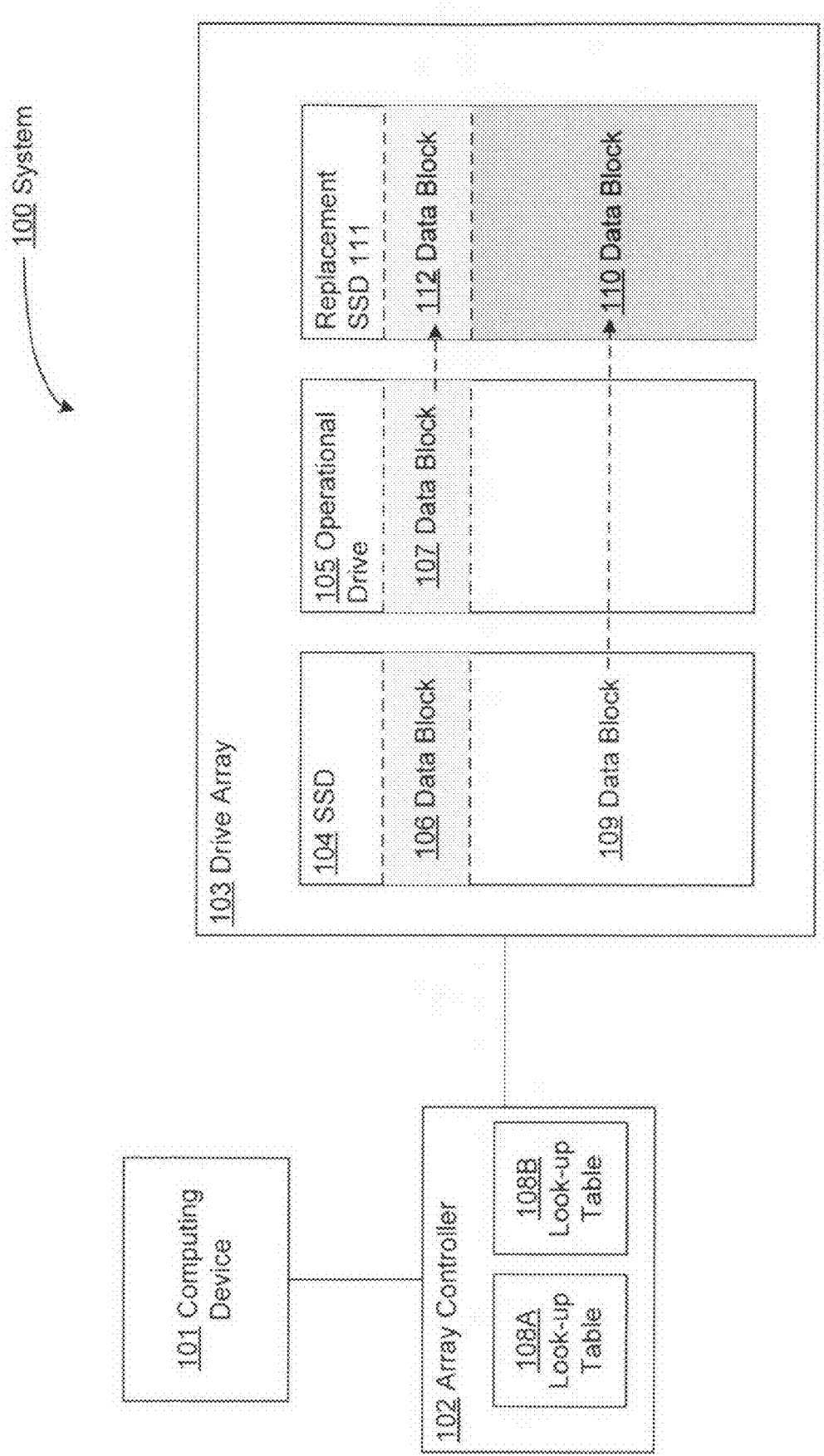
FIG. 1 shows a high-level block system for recovering solid state drive (SSD) data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system in which one or more technologies may be implemented. A data storage system 100 comprising a computing device 101, an array controller 102, and a drive array 103 is shown. The array controller 102 may include drive management circuitry/software whereby the array controller 102 can process read/write requests of the computing device 101 accessing various drives of the drive array 103. The drive array 103 may include a one or more drives including at least one SSD 104 and at least one operational drive 105. The operational drive 105 may be an SSD or a hard disk drive (HDD).

Figure 2:
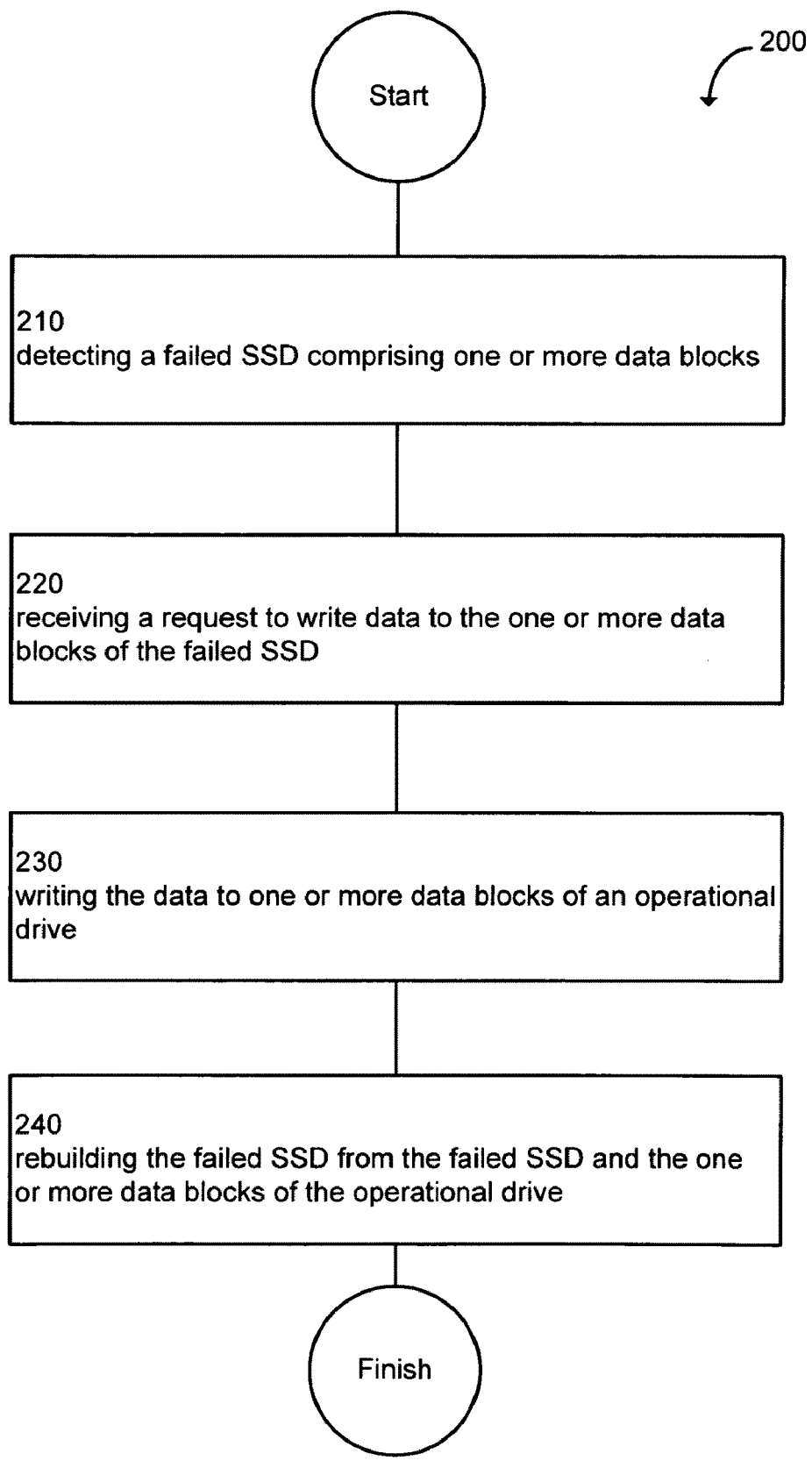
FIG. 2 shows a process for recovering solid state drive (SSD) data.

FIG. 2 illustrates an operational flow 200 representing example operations related to SSD recovery. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. In addition, although the various operational flows are presented in the sequence(s) illustrated, it should be understood that the various operations may be performed in other orders than those that are illustrated, or may be performed concurrently.

After a start operation, the operation 210 illustrates detecting a failed SSD comprising one or more data blocks. For example, as shown in FIG. 1, the array controller 102 may detect that the drive array 103 is no longer capable of processing write instructions to a data block 106 of the drive array 103.

Operation 220 illustrates receiving a request to write data to the one or more data blocks of the failed SSD. For example, as shown in FIG. 1, the array controller 102 may receive a request from the computing device 101 to write data to the data block 106 of the SSD 104.

Operation 230 illustrates writing the data to one or more data blocks of an operational drive. For example, as shown in FIG. 1, the array controller 102 may cause the drive array 103 to write data to a data block 107 of the operational drive 105.

Operation 240 illustrates rebuilding the failed SSD from the failed SSD and the one or more data blocks of the operational drive. For example, as shown in FIG. 1, the array controller 102 may rebuild the SSD 104 from the current contents of the SSD 104 and the operational drive 105 to the replacement SSD 111.

Figure 3:
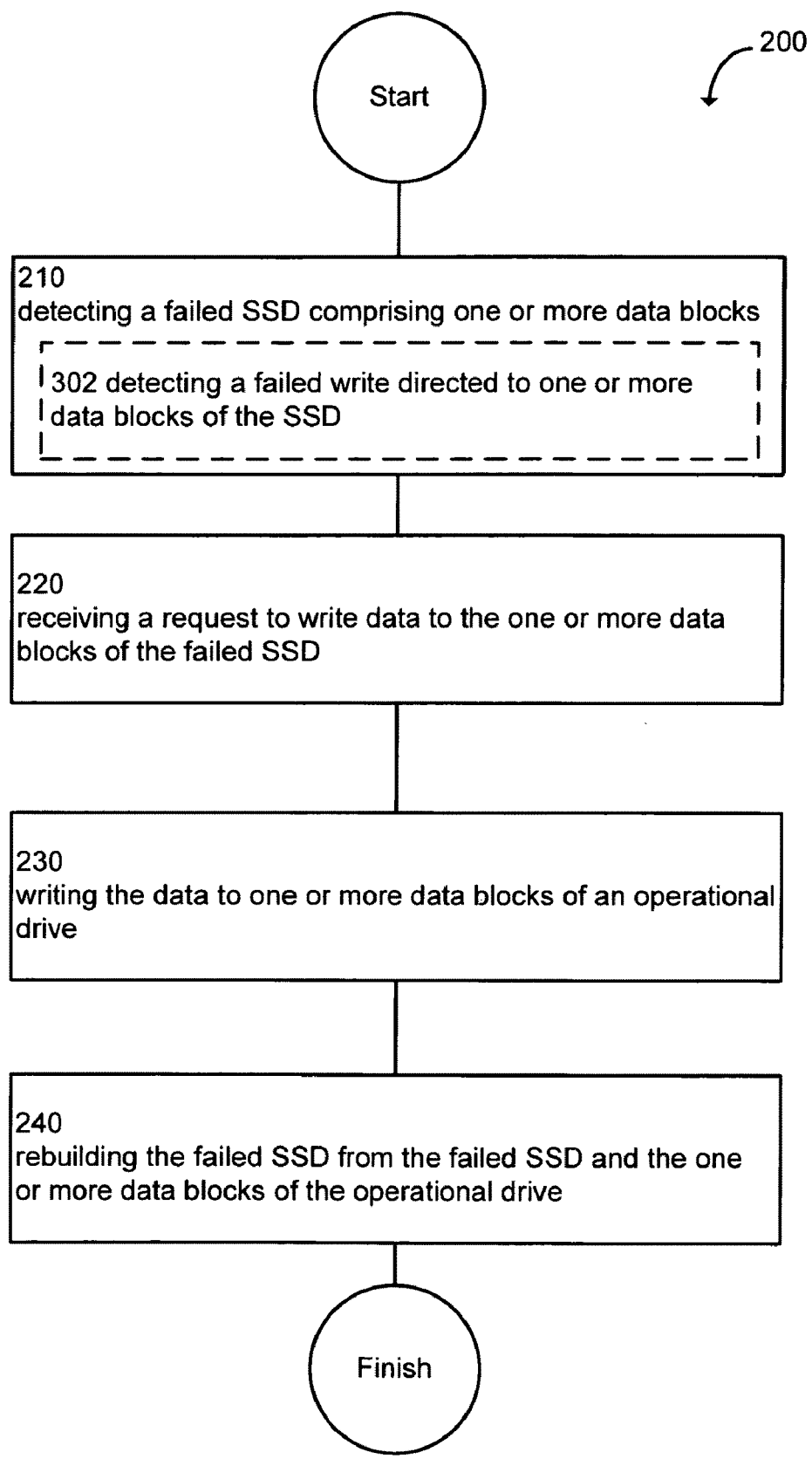
FIG. 3 shows a process for recovering solid state drive (SSD) data.

FIG. 3 illustrates alternative embodiments of the example operational flow 200 of FIG. 2. FIG. 3 illustrates example embodiments where the detecting operation 210 may include at least one additional operation. Additional operations may include an operation 302.

Operation 302 illustrates detecting a failed write directed to one or more data blocks of the SSD. For example, as shown in FIG. 1, the array controller 102 may detect that the drive array 103 is no longer capable of processing write instructions directed to a data block 106 of the SSD 104.

Figure 4:
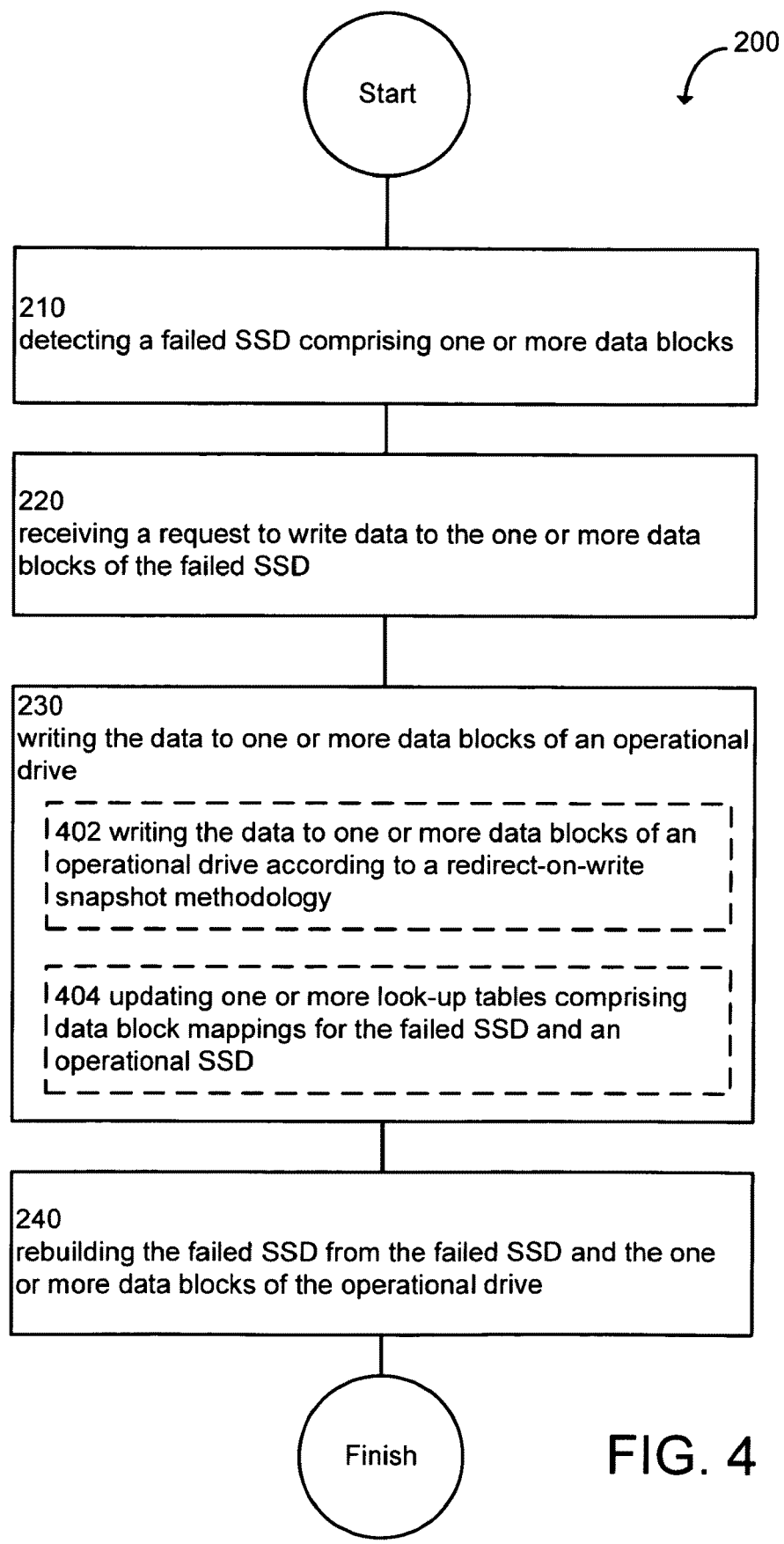
FIG. 4 shows a process for recovering solid state drive (SSD) data.

FIG. 4 illustrates alternative embodiments of the example operational flow 200 of FIG. 2. FIG. 4 illustrates example embodiments where the operational flow 200 may include at least one additional operation. Additional operations may include an operation 402 and/or an operation 404.

Operation 402 illustrates writing the data to one or more data blocks of an operational drive according to a redirect-on-write snapshot methodology. For example, the array controller 102 may cause the SSD 104 to place newly written data in a different location than previously written copy of the same data. As shown in FIG. 7A, multiple data segments may be written to SSD 104. The operational drive 105 may be an SSD that has been erased and is ready to be written. As shown in FIG. 7B, look-up table 108A may maintain the mappings of the data blocks to their respective flash blocks and pages.

As referenced above regarding operations 210 and 220, the array controller 102 may receive a write command for segments 210 and 211 of the SSD 104. Should one or more data blocks of the SSD 104 be detected as failed, the data storage system 100 may employ a redirect-on-write snapshot methodology to maintain the integrity of data in the SSD 104.

As shown in FIG. 8A, the array controller 102 may accept the new data for segments 210 and 211 and write it to pre-erased areas of the operational drive 105. The SSD 104 may remain unchanged (FIG. 8A is modified to show that the data for blocks 210 and 211 in SSD 104 is "old" data).

Upon completion of the write to the operational drive 105, the state of the operational drive 105 is as shown in FIG. 8A. The old copies of data segments 210 and 211 may remain in the SSD 104 until the entire SSD 104 is reclaimed and erased in preparation for reuse. The look-up table 108A in the array controller 102 may be updated to reflect the new addresses for data segments 210 and 211 and appear as shown in FIG. 8B.

Operation 404 illustrates updating one or more look-up tables comprising data block mappings for the failed SSD and an operational SSD. For example, as shown in FIG. 1, the array controller 102 may include one or more look-up tables (e.g. look-up table 108A and look-up table 108B) which maintain mapping lists of memory block elements and their respective flash addresses in the SSD 104 and/or the operational drive 105.

As the SSD 104 may execute a redirect-on-write for every write command received, the SSD 104 may retain a previous copy of user data that can be used to reconstruct both current data or prior snapshot data at no loss in performance. By adding an additional look-up table 108B that can point to previous version of the data in the SSD 104, the data storage system 100 may provide access to multiple point-in-time copies of the data stored in the device.

For example, the array controller 102 may receive a command to store a point in time copy of the data prior to the write of segments 210 and 211. As shown in FIG. 7B, the array controller 102 may retain a copy of the lookup table 108A for the SSD addresses shown in FIG. 7A as the pointers to the addresses for the point in time copy. As shown in 8B, as the volume is updated, the pointers for the current view of the data as shown in FIG. 8A may be maintained in the second look-up table 108B. The array controller 102 may keep a copy of both tables so long as it has space for the snapshot and the snapshot is not ended via some other action.

Figure 5:
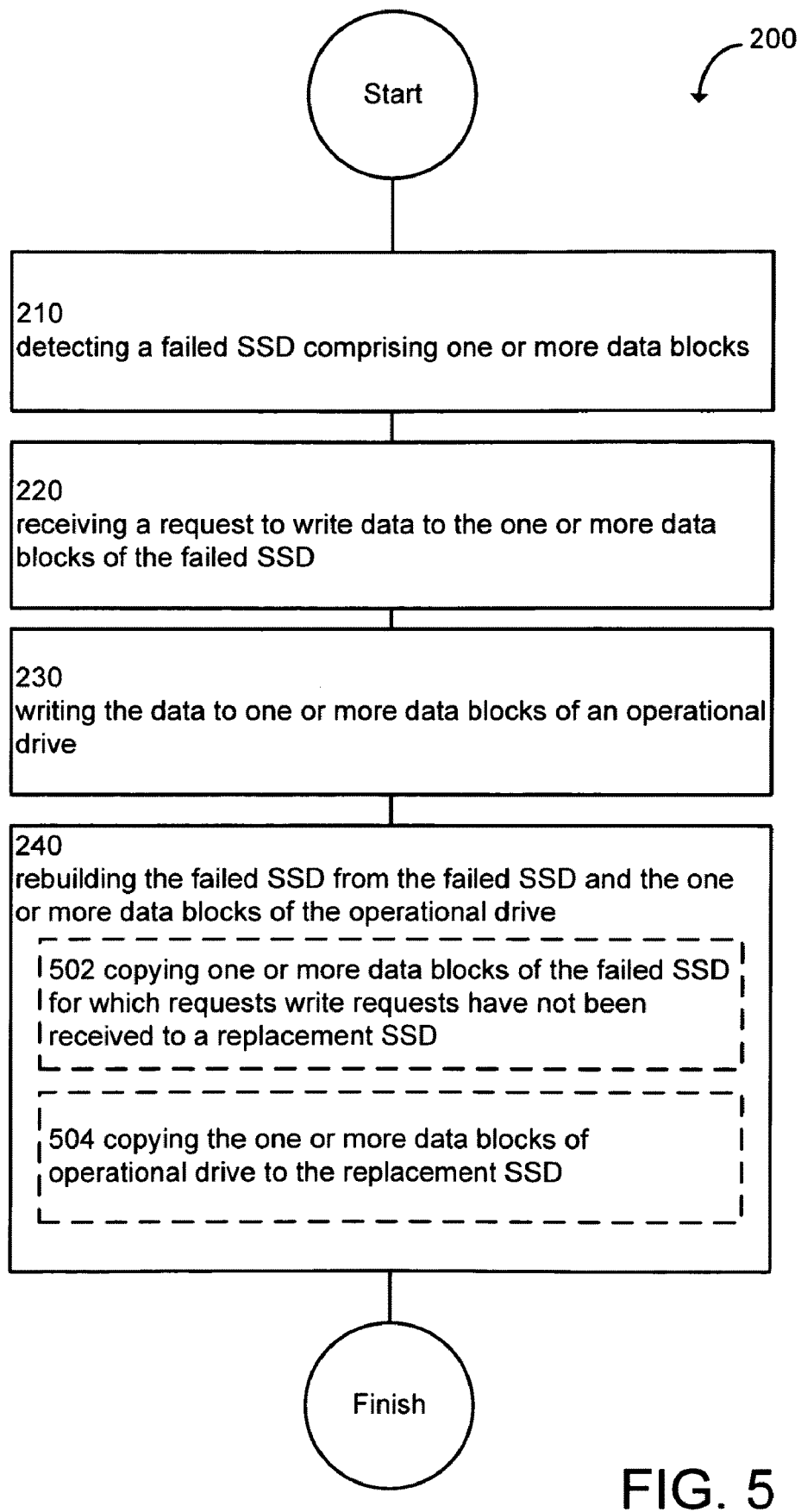
FIG. 5 shows a process for recovering solid state drive (SSD) data.

FIG. 5 illustrates alternative embodiments of the example operational flow 200 of FIG. 2. FIG. 5 illustrates example embodiments where the rebuilding operation 240 may include at least one additional operation. Additional operations may include an operation 502 and/or an operation 504.

Operation 502 illustrates copying one or more data blocks of the failed SSD for which write requests have not been received to a replacement SSD. For example, as shown in FIG. 1, the array controller 102 may cause those portions of SSD 104 that have not been addressed by write requests (e.g. unmodified data block 109) to be copied to a data block 110 of a replacement SSD 111.

Operation 504 illustrates copying the one or more data blocks of the operational drive to the replacement SSD. For example, as shown in FIG. 1, the array controller 102 may cause those portions of operational drive 105 which have been written in response to failed write operations directed to the SSD 104 (e.g. data block 107) to be copied to a data block 112 of the replacement SSD 111.

Figure 6:
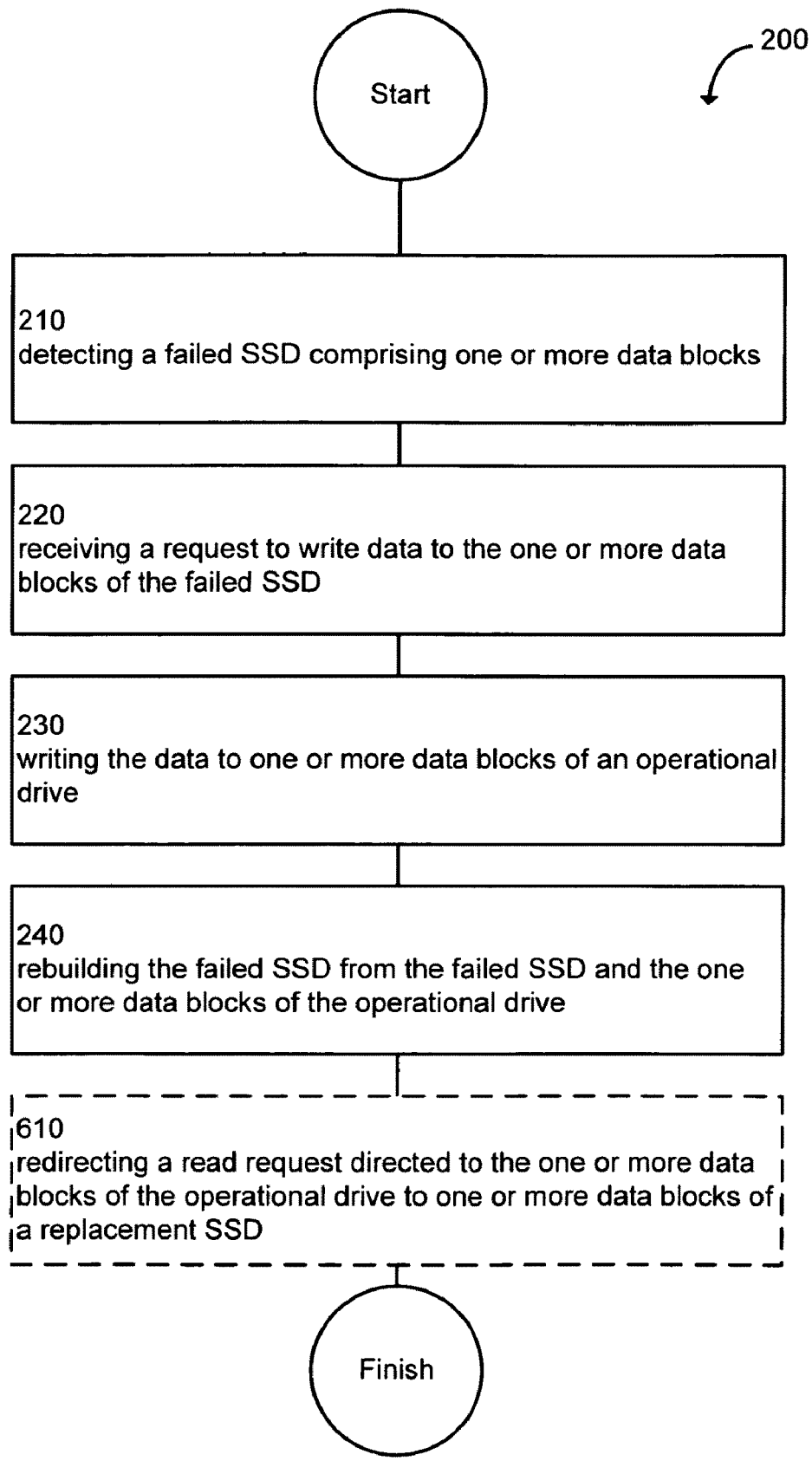
FIG. 6 shows a process for recovering solid state drive (SSD) data.

FIG. 6 illustrates alternative embodiments of the example operational flow 200 of FIG. 2. FIG. 6 illustrates example embodiments where the operational flow 200 may include at least one additional operation. Additional operations may include an operation 610.

Operation 610 illustrates redirecting a read request directed to the one or more data blocks of the operational drive to one or more data blocks of the replacement SSD. For example, as shown in FIG. 1, it may be the case that the operational drive 105 may comprise a HDD. As SSD technology offers faster read performance than an HDD, during the copying of data-blocks from an HDD operational drive 105, the array controller 102, may maintain a pointer to the extent of data that has been written to the replacement SSD 111. When the array controller 102 receives a read request for data that has already been copied from the HDD operational drive 105 to replacement SSD 111 (e.g. data block 112) the array controller 102 may direct the read request to the replacement SSD 111. As such, the replacement SSD 111 may be able to service a potion of the IO stream that would have been serviced by the HDD operational drive 105 and SSD 104 prior to its failure thereby maintaining an increased level of performance as compared to the situation where the IO was serviced by the HDD operational drive 105.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. A method for recovering solid state drive (SSD) data comprising:
    detecting a failed SSD comprising one or more data blocks;
    receiving a request to write data to the one or more data blocks of the failed SSD;
    writing the data to one or more data blocks of an operational drive;
    rebuilding the failed SSD from the failed SSD and the one or more data blocks of the operational drive,
wherein the rebuilding the failed SSD from the failed SSD and the one or more data blocks of the operational drive further comprises:
    copying one or more data blocks of the failed SSD for which write requests have not been received to a replacement SSD;
    copying the one or more data blocks of the operational drive to the replacement SSD.

2. The method of claim 1, wherein the detecting a failed SSD comprising one or more data blocks further comprises:
    detecting a failed write directed to one or more data blocks of the SSD.

3. The method of claim 1, wherein the writing the data to one or more data blocks of an operational drive further comprises:
    writing the data to one or more data blocks of an operational drive according to a redirect-on-write snapshot methodology.

4. The method of claim 1, wherein the writing the data to one or more data blocks of an operational drive further comprises:
    updating one or more look-up tables comprising data block mappings for the failed SSD and an operational SSD.

5. The method of claim 1, wherein the copying the one or more data blocks of the operational drive to the replacement SSD further comprises:
    redirecting a read request directed to the one or more data blocks of the operational drive to one or more data blocks of the replacement SSD.

6. A system for recovering solid state drive (SSD) data comprising:
    means for detecting a failed SSD comprising one or more data blocks;
    means for receiving a request to write data to the one or more data blocks of the failed SSD;
    means for writing the data to one or more data blocks of an operational drive;
    means for rebuilding the failed SSD from the failed SSD and the one or more data blocks of the operational drive,
wherein the means for rebuilding the failed SSD from the failed SSD and the one or more data blocks of the operational drive further comprises:
    means for copying one or more data blocks of the failed SSD for which write requests have not been received to a replacement SSD;
    means for copying the one or more data blocks of the operational drive to the replacement SSD.

7. The system of claim 6, wherein the means for detecting a failed SSD comprising one or more data blocks further comprises:
    means for detecting a failed write directed to one or more data blocks of the SSD.

8. The system of claim 6, wherein the means for writing the data to one or more data blocks of an operational drive further comprises:
    means for writing the data to one or more data blocks of an operational drive according to a redirect-on-write snapshot methodology.

9. The system of claim 6, wherein the means for writing the data to one or more data blocks of an operational drive further comprises:
    means for updating one or more look-up tables comprising data block mappings for the failed SSD and an operational SSD.

10. The system of claim 6, wherein the means for copying the one or more data blocks of the operational drive to the replacement SSD further comprises:
    means for redirecting a read request directed to the one or more data blocks of the operational drive to one or more data blocks of the replacement SSD.

11. A system for recovering solid state drive (SSD) data comprising:
    circuitry for detecting a failed SSD comprising one or more data blocks;
    circuitry for receiving a request to write data to the one or more data blocks of the failed SSD;
    circuitry for writing the data to one or more data blocks of an operational drive;

circuitry for rebuilding the failed SSD from the failed SSD and the one or more data blocks of the operational drive, wherein the circuitry for rebuilding the failed SSD from the failed SSD and the one or more data blocks of the operational drive further comprises:
- circuitry for copying one or more data blocks of the failed SSD for which write requests have not been received to a replacement SSD;
- circuitry for copying the one or more data blocks of the operational drive to the replacement SSD.

12. The system of claim 11, wherein the circuitry for detecting a failed SSD comprising one or more data blocks further comprises:
- circuitry for detecting a failed write directed to one or more data blocks of the SSD.

13. The system of claim 11, wherein the circuitry for writing the data to one or more data blocks of an operational drive further comprises:
- circuitry for writing the data to one or more data blocks of an operational drive according to a redirect-on-write snapshot methodology.

14. The system of claim 11, wherein the circuitry for writing the data to one or more data blocks of an operational drive further comprises:
- circuitry for updating one or more look-up tables comprising data block mappings for the failed SSD and an operational SSD.

15. The system of claim 11, wherein the circuitry for copying the one or more data blocks of the operational drive to the replacement SSD further comprises:
- circuitry for redirecting a read request directed to the one or more data blocks of the operational drive to one or more data blocks of the replacement SSD.

* * * * *